United States Patent [19]
McKinney

[11] Patent Number: 4,577,412
[45] Date of Patent: Mar. 25, 1986

[54] RHEOMETER ROTOR HEIGHT GAUGE

[75] Inventor: Robert L. McKinney, Mogadore, Ohio

[73] Assignee: The Goodyear Tire & Rubber Company, Akron, Ohio

[21] Appl. No.: 662,235

[22] Filed: Oct. 18, 1984

[51] Int. Cl.⁴ .............................................. G01B 3/22
[52] U.S. Cl. ................................... 33/172 R; 73/1 R
[58] Field of Search ................ 33/172 R; 73/1 R, 1 C

[56]          References Cited
U.S. PATENT DOCUMENTS

| 1,303,387 | 5/1919 | Pogue | 33/172 R |
| 2,819,534 | 1/1958 | Kitzman | 33/172 R X |
| 3,645,002 | 2/1972 | Hefti | 33/172 R |
| 4,462,161 | 7/1984 | Roy | 33/172 R X |

FOREIGN PATENT DOCUMENTS 347409  1/1922  Fed. Rep. of Germany .... 33/172 R

*Primary Examiner*—Stewart J. Levy
*Assistant Examiner*—Joseph W. Roskos
*Attorney, Agent, or Firm*—Allegretti, Newitt, Witcoff & McAndrews Ltd.

[57]         ABSTRACT

A rheometer rotor height gauge (54) with an indicator (56) on a sleeve (58) slidably mounted on a pedestal (62) of a base (60). A shaft (70) operatively connected to the indicator (56) projects downward to a rheometer rotor contacting member (68). The pedestal (62) is atop legs (64) atop feet (66). The gauge provides accurate readings of rotor (38) height relative to a rheometer die (14).

7 Claims, 6 Drawing Figures

RHEOMETER ROTOR HEIGHT GAUGE

BACKGROUND OF THE INVENTION

This invention relates to apparatus and processes for curing and testing rubber. More specifically, this invention relates to a height gauge for facilitating adjustment of the height of rotors of rheometers in relation to dies of the rheometer.

Rheometers are known to the art of curing and testing rubber. As now known, a rheometer is a device for curing and testing rubber with a heated curing chamber into which raw uncured rubber samples are loaded to be transformed into the different, cured state. Within the heated curing chamber, a small ribbed rotor oscillates in contact with a loaded sample. A strain gauge senses torque upon the rotor caused by resistance of the rubber sample to rotor oscillation. Limit switches activate momentarily at each of the two extremes of rotor oscillation, to indicate the precise moments at which peak stress occurs. A recording device produces a graph of torque at peak stress versus time over the duration of a cure. A human operator observing the graph stops the cure by opening the rheometer and removing the sample. The operator stops the cure after the maximum torque at peak stress is reached and observed. Cure characteristics of the samples, including maximum torque at peak stress, are used for quality assurance of rubber batches from which the samples are taken, compounding error detection, and design of items made of the batches.

In the past, rheometer rotor height in relation to the rheometer dies was set only by arbitrary visual estimate of rotor height.

SUMMARY OF THE INVENTION

Arbitrary visual setting of rheometer rotor height has caused non-reproducibility and non-comparability in rheometer-generated data. Readings generated on an individual rheometer have varied from before and after such visual settings without correlation to changes in rubber properties. Readings from one rheometer to another have varied similarly.

This invention minimizes such variation to the point of effective elimination of such variation, through elimination of arbitrary visual setting. Rotor height is actually measured and precisely displayed for facilitating rotor height adjustment. A device is provided which is able to accuratley rest on the lower die and thereby provide an accurate benchmark on the rheometer. The device is effectively unaffected by die heat, and is capable of remaining in place during a full process of adjustment for assuring highly accurate adjustment. The device is also readily calibrated.

The device is a rheometer rotor height gauge comprising indicator means such as a dial indicator; support means for the indicator such as a base with a cylindrical pedestal atop arcuate legs terminating in narrow feet; and a movable rotor contact member projecting downward between the legs and operatively connected to the indicator. As preferred, the indicator is movable relative to the support, and the gauge further includes means for adjusting the position of the indicator relative to the support, for gauge calibration.

The objects, advantages and details of the invention are more fully detailed in the detailed description of the preferred embodiment of the invention. This description follows, after a brief description of the accompanying drawing.

DETAILED DESCRIPTION OF THE PREFERRED EMBODIMENT

Figure 6:
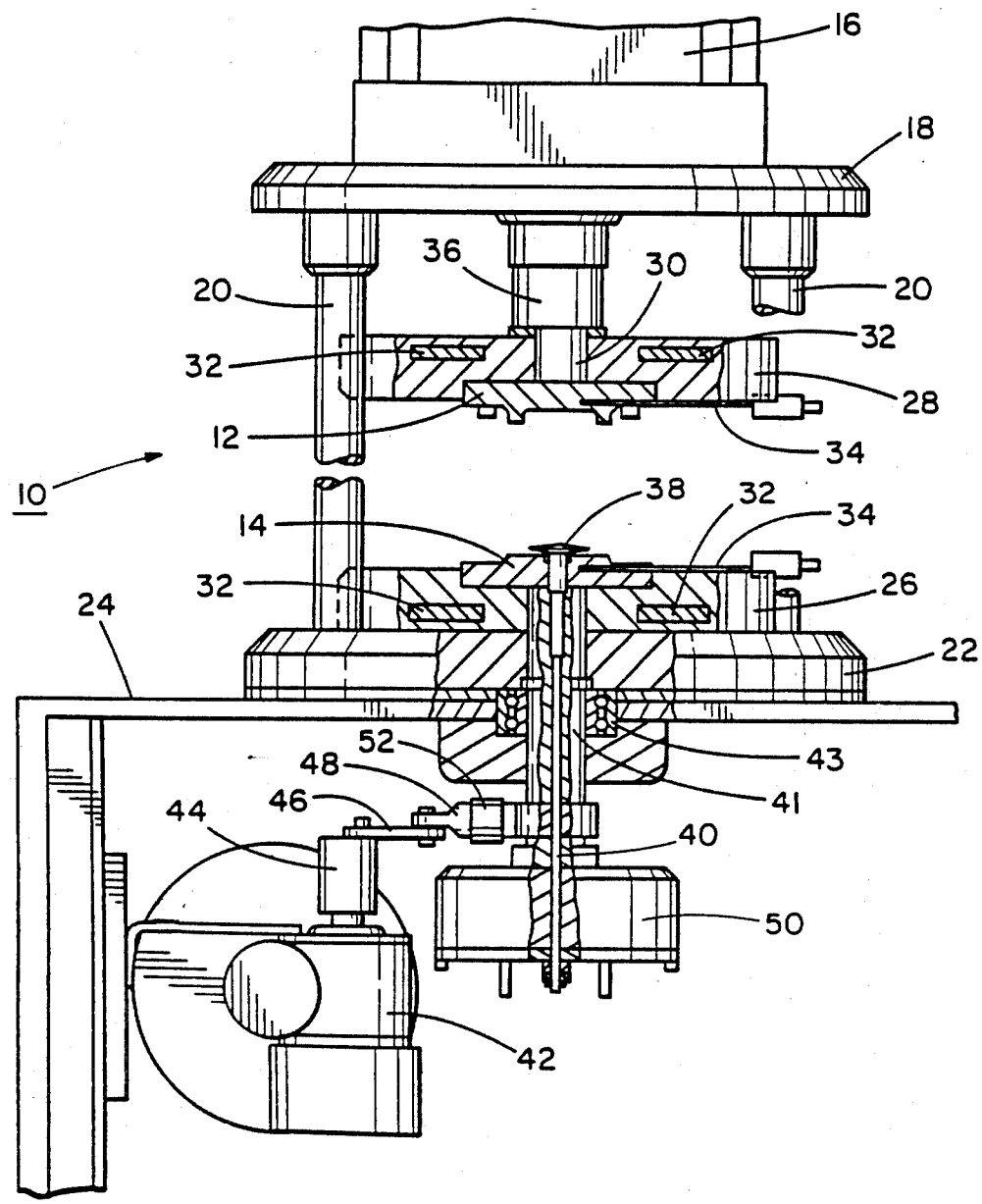
FIG. 6 is a diagramatic view of a typical rheometer with which the invention is used.

Referring to FIG. 6 first, for background description, a typical rheometer 10 comprises, in part, a rheometer upper die 12 and a lower die 14. The dies 12, 14 define a die cavity for rubber samples (samples not shown). Samples are successively loaded in the die cavity, which is closed by lowering the upper die 12 through operation of a pneumatic cyinder 16.

The cylinder 16 is supported atop a frame plate 18 and underlying frame rods 20. The rods 20 extend from a rod base 22 atop a base support 24. The lower die 14 rests on a lower heating platen 26, which rests on the base 22. The upper die 12 is mounted to the underside of an upper heating platen 28, which is mounted to the rod 30 of the cylinder 16.

The platens 26, 28 include embedded elerctrical heaters 32. The dies 12, 14 include heat probes 34. A rod insulator 36 protects the rod 30 from heat.

The heaters 32 heat the platens 26, 28, dies 12, 14 and any sample in the die cavity. The probes 34 provide feedback for accurate control of the heaters 32, and accurate heating of samples.

a biconical disc 38 of a rotor projects into the die cavity. The disc 38 is mounted atop an oscillatory rotor shaft 40, which projects through the lower die 14, lower platen 26, rod base 22 and base support 24. The shaft 40 is rotatably mounted to the base support 24 within a shaft support 41 and bearing 43. The shaft 40 and disc 38 are oscillated by a main, line synchronous motor and gear box 42 mounted to the base support 24. The main motor and gear box 42 drive an eccentric 44. The eccentric 44 rotates, and rotates the attached end of a link arm 46. The other end of the link arm 46 oscillates a torque arm 48 and the shaft 40.

The rotor shaft 40 is pneumatically clamped by a pneumatic clamping mechanism 50. The rotor is oscillated through an arc of a few degrees, preferably at approximately 100 cycles per minute as determined by the motor 42 and gear box. Limit switches 51 (not shown in FIG. 6) respond to the extremes of movement of the link arm 46, to indicate the precise moments at which the link arm and disc 38 reach maximum travel, and thereby the precise moments at which peak stress occurs on a sample.

A torque arm transducer, such as the strain gauge 52, measures the torque upon or strain in the torque arm 48. The strain in the torque arm 48 is representative of, and more specifically, proportional to, the torque upon the arm 48, arising from the resistance of the sample to the oscillation of the rotor. The resistance arises from the increases with cross-linking occurring within the rubber as it cures. Thus, the gauge 52 measures the strain upon the rotor, which is proportional to the torque of the resisting rubber samples. The torque applied to the rotor causes a change in the voltage of the transducer proportional to the torque arising from the sample resisting oscillation of the rotor. The frequency of the torque signal is approximately 100 cycles per minute, corresponding to the frequency of rotor oscillation.

Figure 1:
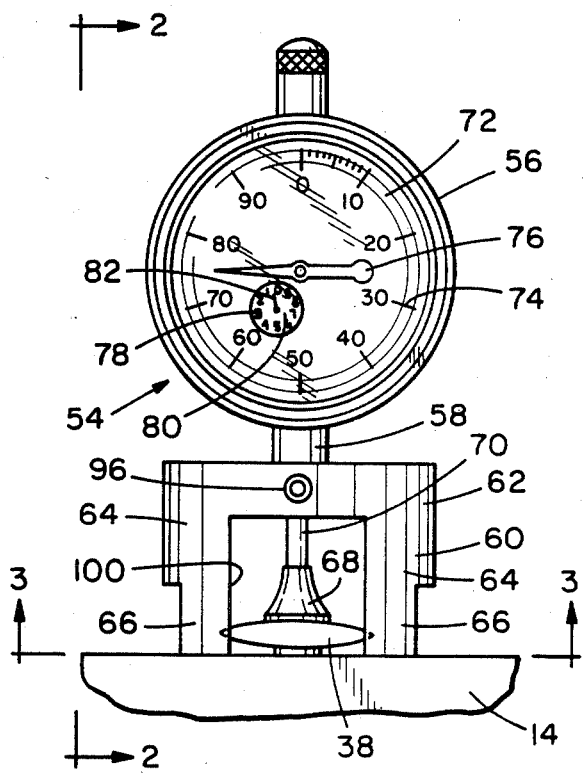
FIG. 1 is a front elevation view of the specific rheometer rotor height gauge which is the preferred embodiment of the invention, as positioned over a rheometer rotor.
Figure 2:
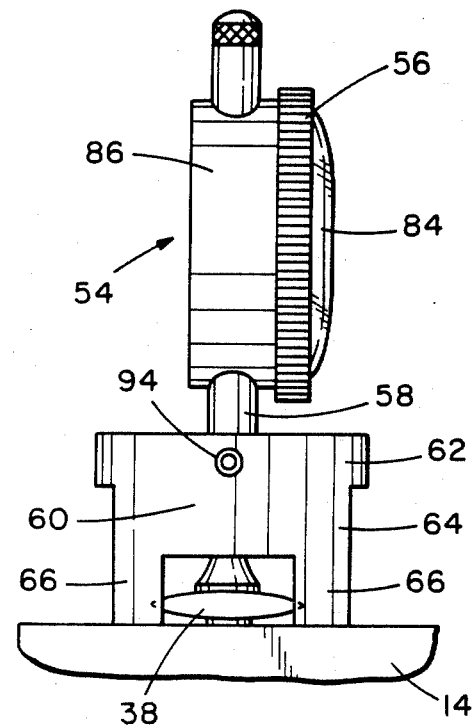
FIG. 2 is a side elevation view of the preferred rheometer rotor height gauge.

Turning to FIGS. 1 and 2, the preferred embodiment of the invention is a specific rheometer rotor height gauge 54. The gauge 54 comprises, in basics, a dial indicator 56 on a sleeve 58; a base 60 including a pedestal 62, arcuate legs 64, and feet 66; and a rotor contact member 68 on a shaft 70.

The dial indicator 56 includes a dial face 72 with circumferentially spaced, outer and first markings 74. A first needle indicator 76 is centrally, rotatably mounted on the face 72 for movement among the markings 74. A set of circumferentially spaced, inner and second markings 78 are on an inset face 80 to the face 72. A second needle indicator 82 is rotatably mounted on the inset face 80 for movement among the markings 78.

The face 72 and needle indicators 76, 82 are protected behind a shield 84, of glass or the like. The shield 84 is securely fitted to a case 86.

Within the case 86 and behind the face 72, the dial indicator 56 includes a mechanism as known in indicators to cause movement of the needles 76, 82 in linear relationship to linear movement of an internal instrument member. Movement of the inset needle indicator 82 is at a rate one tenth of movement of the needle indicator 76, for precise second decimal readings from among the markings 74.

The case 86 and thereby the dial indicator 72 are fixed on the sleeve 58. The sleeve is hollow at least in the lower portion projecting from under the case 86. The passage defined within the hollow sleeve 58 provides for a shaft to extend within the sleeve into the case for operative connection with the needle indicator driving mechanism. The dial indicator is thereby capable of providing precise visual indication of movement of an external, moving member.

Figure 3:
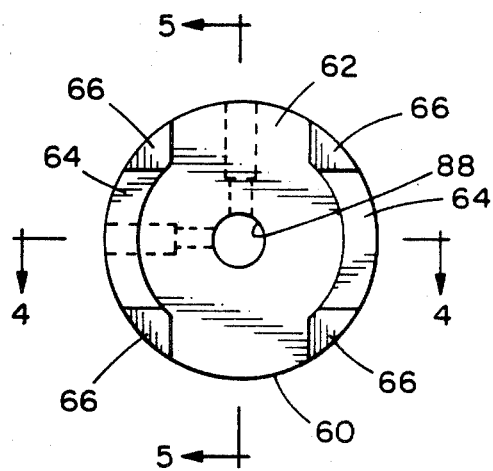
FIG. 3 is a bottom view of the base only of the preferred rheometer rotor height gauge, as seen from along line 3—3 in FIG. 1.
Figure 4:
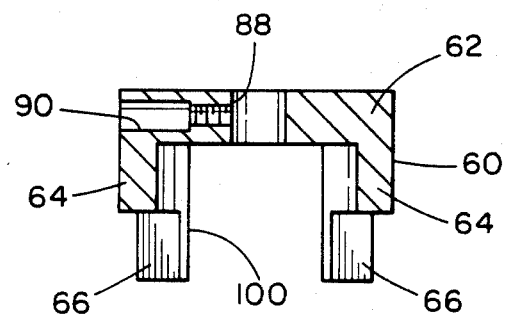
FIG. 4 is a first cross-sectional view of the base of the preferred rheometer rotor height gauge, taken along line 4—4 in FIG. 3.
Figure 5:
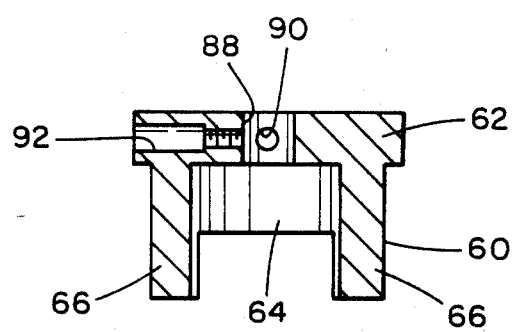
FIG. 5 is a second cross-sectional view of the base of the preferred rheometer rotor height gauge, taken along line 5—5 of FIG. 3, at right-angles to FIG. 4.

The shaft so described is the shaft 70. The shaft 70 extends from within the case 86 through the sleeve 58 and through the pedestal 62. As shown in FIGS. 3-5, the pedestal 62 defines a central opening 88 for the sleeve 58, through which the shaft 70 extends. The rotor contact member 68 is fixedly mounted on the shaft 70, and presents a precisely flat bottom surface to the rheometer rotor 38.

The sleeve 58 is slidable within the opening 88. A pair of horizontal, threaded bores 90, 92 extend into the opening 88 through the pedestal 62. The bores 90, 92 are at right angles to each other. A pair of set screws 94, 96 are threaded into the bores 90, 92, and are releasably set against the sleeve 58. Calibration of the dial indicator 72 is provided by sliding motion of the sleeve 58 in the opening 88, and setting of the screws 94, 96 to fix the sleeve relative to the pedestal 62.

The pedestal 62 of the base 60 is cylindrical, and integrally machined with the legs 64 and feet 66. All are of tool steel or the like, as are the shaft 58 and contact member 68.

The legs 64 are two in number, and mirror images of each other across a vertical centerline, line 5—5 in FIG. 3, of the base 60. Each leg 64 is arcuate and partially annular in horizontal cross-section, as shown best in FIG. 3. The legs project downward of the pedestal 62.

The feet 66 are four in number, two to a leg 64. The feet are located at the horizontal extremities of the legs 64, to visually and operatively define the four corners of a square. The feet are also located at the vertical bottoms of the legs. The bottom and rheometer die contacting surfaces of the feet are precisely machined to be co-planar with each other, in a plane precisely perpendicular to the longitudinal extent of the shaft 70. The planer bottom surface of the rotor contacting member 68 is precisely parallel to the plane of the feet bottom surfaces.

The construction and arrangement of the pedestal, legs and feet as described accomplish a multitude of functions. First, and as now apparent, the pedestal, legs and feet support the sleeve 58, and thereby the dial indicator 72, shaft 70 and contact member 68. The shaft 70 projects between the legs 64, and is protected circumferentially by the legs, especially along the arcuate portion of each leg between its feet. Simultaneously, a clear viewing area for accurate placement of the number 68 on the rotor 38 is provided, the viewing area extending fully through the base 60 in the gaps 100 defined between the legs 64.

The feet 66 are narrowed in relation to the legs 64 and pedestal 62 such that the minimal heat transferred from a hot die 14 to the feet 66 sinks in the legs 64 and pedestal 62. During time periods sufficient for accurate adjustment of the rotor 38, the heat is effectively prevented from reaching the dial indicator 72. The physical isolation of the shaft 70 from the base 60 substantially prevents heat transfers to the shaft 70, whereby heat expansion inaccuracies are minimized.

The preferred embodiment of the invention is now described. This preferred embodiments constitutes the best mode contemplated by the inventor of carrying out the invention. The invention, and the manner and process of making and using it, have been described in full, clear, concise and exact terms to enable any person skilled in the art to make and use the same. Because the invention may be copied without the copying of the precise details of the preferred embodiment, the following claims particularly point out and distinctly claim the subject matter which the inventor regards as his invention and wishes to protect.

What is claimed is:

1. A rheometer rotor height gauge for facilitating adjustment of the height of a rotor of a rheometer in relation to a die of the rheometer, the gauge comprising:
   an indicator for visual indicating variation of a position variable;
   a movable rotor contact member depending from and operatively connected to the indicator for contacting the rheometer rotor, whereby the position variable indicated by the indicator is rotor height;
   a base for supporting the indicator atop the die of the rheometer and supporting the rotor contact member atop the rotor in which the base includes a cylindrical pedestal, arcuate legs define a clear viewing gap for viewing the rotor contact member through the base, and feet, the pedestal being atop the legs and the legs being atop the feet; and leg portions depending downward of the pedestal between the feet for protecting the rotor contact member.

2. A rheometer rotor height gauge as in claim 1 in which the indicator member is movable relative to the base, the gauge further comprising means for releasably fixing the indicator relative to the base for calibration of the gauge.

3. A rheometer rotor height gauge as in claim 1 in which the gauge further comprising a sleeve and shaft, the dial indicator being on the sleeve which is supported on the base, and the rotor contact member being on the shaft which is within the sleeve and operatively connected to the dial indicator.

4. A rheometer rotor height gauge as in claim 3 in which the sleeve is slidably mounted on the base for calibration of the dial indicator.

5. A rheometer rotor height gauge as in claim 1 in which the feet include rheometer die contacting surfaces coplanar with each other and lying in a plane perpendicular to a longitudinal extent of the sleeve.

6. A rheometer rotor height gauge for facilitating adjustment of the height of a rotor of a rheometer in relation to a die of the rheometer, the gauge comprising:
   a plurality of feet with die contacting surfaces coplanar in a plane;
   legs atop the feet;
   a pedestal atop the legs defining an opening perpendicular to the plane of the surfaces of the feet;
   a hollow sleeve slidably mounted in the opening of the pedestal;
   set screws mounted on the pedestal and movable against the sleeve to fix the sleeve relative to the pedestal;
   a dial indicator fixedly mounted on the sleeve;
   a shaft within the sleeve extending through the opening of the pedestal between the legs and operatively connected to the dial indicator; and
   a rheometer rotor contact member fixedly mounted on the shaft.

7. A method of calibrating a rheometer having a rheometer rotor and a rheometer die comprising:
   positioning a rheometer rotor height gauge with an indicator providing indicator readings and an operatively connected rotor contact member on the rheometer die with the rotor contact member in contact with the rheometer rotor and thereby actuating the indicator; and
   calibrating the rheometer by calibrating the height of the rheometer rotor in relation to the rheometer die on the basis of indicator readings.

* * * * *

UNITED STATES PATENT AND TRADEMARK OFFICE
CERTIFICATE OF CORRECTION

PATENT NO. :  4,577,412

DATED     :  March 25, 1986

INVENTOR(S) :  Robert L. McKinney

It is certified that error appears in the above-identified patent and that said Letters Patent is hereby corrected as shown below:

Column 4, line 65 insert the word --which-- after the word "legs".

Signed and Sealed this

Nineteenth Day of August 1986

[SEAL]

Attest:

Attesting Officer

DONALD J. QUIGG

Commissioner of Patents and Trademarks